United States Patent
Huang et al.

(10) Patent No.: US 7,423,632 B2
(45) Date of Patent: Sep. 9, 2008

(54) MOUSE WITH A BUILT-IN LASER POINTER

(75) Inventors: Hsun-Li Huang, Hsinchu (TW); Chun-Hsiung Yin, Tainan (TW)

(73) Assignee: QISDA Corporation, Taoyuan (TW)

( * ) Notice: Subject to any disclaimer, the term of this patent is extended or adjusted under 35 U.S.C. 154(b) by 646 days.

(21) Appl. No.: 11/059,888

(22) Filed: Feb. 17, 2005

(65) Prior Publication Data

US 2005/0179658 A1    Aug. 18, 2005

(30) Foreign Application Priority Data

Feb. 18, 2004    (TW)    ............................... 93103997 A

(51) Int. Cl.
G09G 5/08    (2006.01)
(52) U.S. Cl. ...................... 345/163; 345/158
(58) Field of Classification Search ................ 345/163, 345/158, 157, 166; 348/569; 708/141; 341/176, 341/173; 398/106; 463/37
See application file for complete search history.

(56) References Cited

U.S. PATENT DOCUMENTS

| | | | |
|---|---|---|---|
| 6,295,051 B1 * | 9/2001 | Kanevsky et al. ........... | 345/163 |
| 6,304,249 B1 * | 10/2001 | Derocher et al. ........... | 345/163 |
| 6,417,840 B1 * | 7/2002 | Daniels ...................... | 345/158 |
| 6,466,154 B1 * | 10/2002 | Kim et al. ................... | 341/176 |
| 6,590,563 B1 * | 7/2003 | Oross et al. ................. | 345/163 |
| D506,199 S * | 6/2005 | Huang et al. ................ | D14/408 |
| 7,061,468 B2 * | 6/2006 | Tiphane et al. .............. | 345/158 |
| 2001/0025289 A1 * | 9/2001 | Jenkins et al. .............. | 708/141 |
| 2002/0190952 A1 * | 12/2002 | Shah .......................... | 345/163 |
| 2003/0016417 A1 * | 1/2003 | Lee ............................. | 359/142 |
| 2005/0116933 A1 * | 6/2005 | Huang et al. ................ | 345/163 |

FOREIGN PATENT DOCUMENTS

GB    2391370 A    *    2/2004
WO    WO 9741502 A1    *    11/1997

OTHER PUBLICATIONS

PC World, CES 2004: Picks and Pans, Jan. 10, 2004, 7 pages.*

* cited by examiner

*Primary Examiner*—Chanh Nguyen
*Assistant Examiner*—Ram A Mistry
(74) *Attorney, Agent, or Firm*—Thomas, Kayden, Horstemeyer & Risley

(57) ABSTRACT

A mouse with a built-in laser pointer including a mouse body, a first holding portion, a second holding portion, a laser source and a laser-emitting button is provided. Both the first holding portion and the second holding portion are pivotally connected to the mouse body. The laser source is disposed on either the first or the second holding portion. The laser-emitting button disposed on one of the mouse body, the first and the second holding portions activates the laser source. When the first and the second holding portions are parallel, the mouse with a built-in laser pointer controls a cursor's movement on a computer screen. When the first holding portion and the second holding portion are relatively open, the user can hold either the first or the second holding portion for operating the laser-emitting button for the laser source to emit laser beams.

17 Claims, 8 Drawing Sheets

MOUSE WITH A BUILT-IN LASER POINTER

This application claims the benefit of Taiwan application Serial No. 93103997, filed Feb. 18, 2004, the subject matter of which is incorporated herein by reference.

BACKGROUND OF THE INVENTION

1. Field of the Invention

The invention relates in general to a mouse, and more particularly to a mouse with a built-in laser pointer capable of changing operating modes.

2. Description of the Related Art

Due to the great popularity of personal computers in recent years, it is very common for an institution, a business entity or a teaching institution for instances, to employ computer software and associated peripherals in presentation. Normally, the presenter will use a laser pointer to help with the presentation, so that the audience can better understand the contents of the presentation. Since laser pointer is not part of standard computer accessories, the presenter has to prepare one for him- or herself if he or she would like to use a computer system to assist the presentation. However, this would be an additional burden to the presenter.

In order to reduce the presenter's burden, an ordinary laser pointer can be added onto an ordinary mouse to further equip the mouse with a presentation pointing function. However, this alternative simply adds a presentation pointing function to an ordinary mouse without making any adjustment in terms of design. Consequently, when an ordinary presentation pointing mouse is used as a laser pointer, the presenter must operate the laser pointer by holding the mouse due to the configuration of the mouse. Holding the mouse to operate the laser pointer not only labors the hand but also causes inconvenience to the presenter. Besides, an ordinary presentation pointing mouse does not provide the presenter with the function of controlling slide display, causing inconvenience to the presenter if he or she would like to change a slide.

SUMMARY OF THE INVENTION

It is therefore an object of the invention to provide a mouse with a built-in laser pointer, capable of improving the inconvenience of having to hold an ordinary presentation pointing mouse when used as a laser pointer, providing an additional presentation control button for the presenter to control the display of a slide during presentation.

The invention achieves the above-identified object by providing a mouse with a built-in laser pointer including a mouse body, a first holding portion, a second holding portion, a laser source and a laser-emitting button.

The first holding portion and the second holding portion are pivotally connected to the mouse body, wherein the first holding portion has a first button while the second holding portion has a second button. The laser source is disposed on the first holding portion or the second holding portion, while the laser-emitting button is disposed on the mouse body, the first holding portion or the second holding portion for switching on the laser source. When the first holding portion and the second holding portion are parallel to each other, the mouse with a built-in laser pointer is for switching on a cursor's movement on a computer screen while the first button and the second button are available for the user. When the first holding portion and the second holding portion are relatively open, the user can hold the first holding portion or the second holding portion to operate the laser-emitting button for the laser source to emit laser beams.

According to another object of the invention, a mouse with a built-in laser pointer including a mouse body, a first holding portion, a second holding portion, a laser source and a laser-emitting button is provided. The first holding portion and the second holding portion are pivotally connected to the mouse body. The first holding portion has a first top surface, a first lateral junction and a first button, the second holding portion has a second top surface, a second lateral junction and a second button, wherein the first button and the second button are respectively disposed on the first top surface and the second top surface. The laser source is disposed on the first lateral junction or the second lateral junction, while the laser-emitting button is disposed on the mouse body, the first holding portion or the second holding portion for switching on the laser source. When the first lateral junction and the second lateral junction contact each other, the mouse with a built-in laser pointer is for switching on a cursor's movement on a computer screen. Meanwhile, the user can place his or her hand on the first top surface of the first holding portion and the second top surface of the second holding portion to hold the mouse with a built-in laser pointer to operate the first button and the second button. When the first holding portion and the second holding portion are relatively open, the user can hold the first holding portion or the second holding portion to operate the laser-emitting button for the laser source to emit laser beams.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1A:
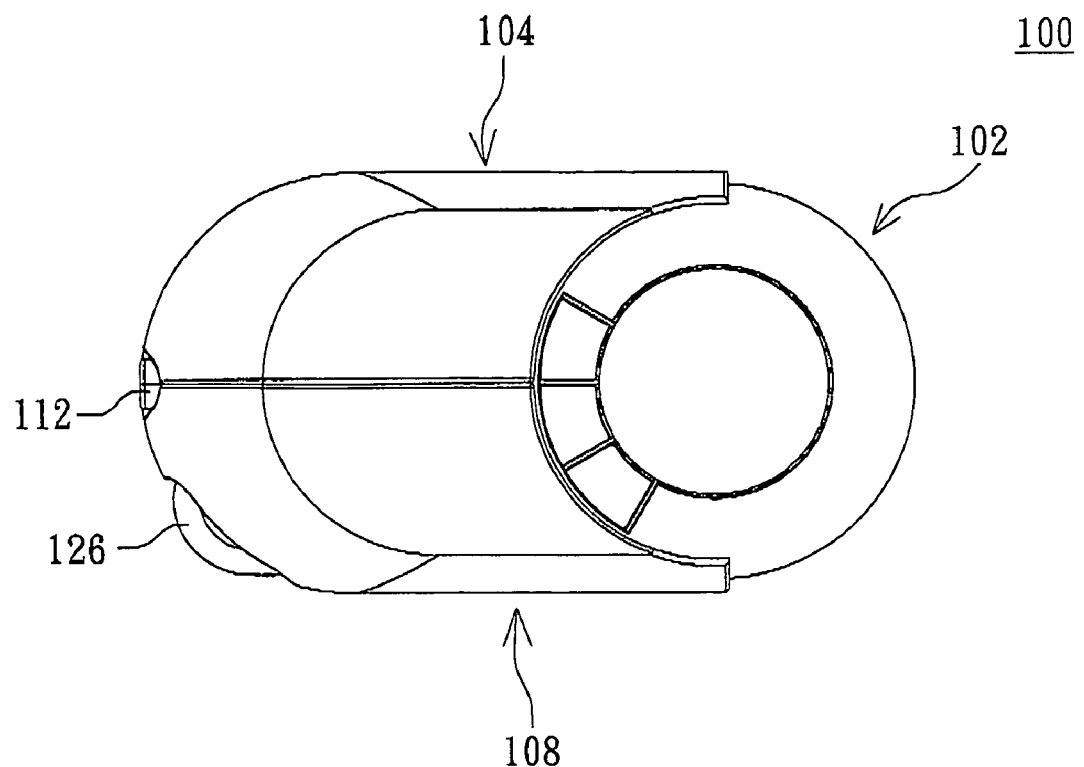
FIG. 1A shows an upward view of a mouse with a built-in laser pointer according to a preferred embodiment of the invention.
Figure 1B:
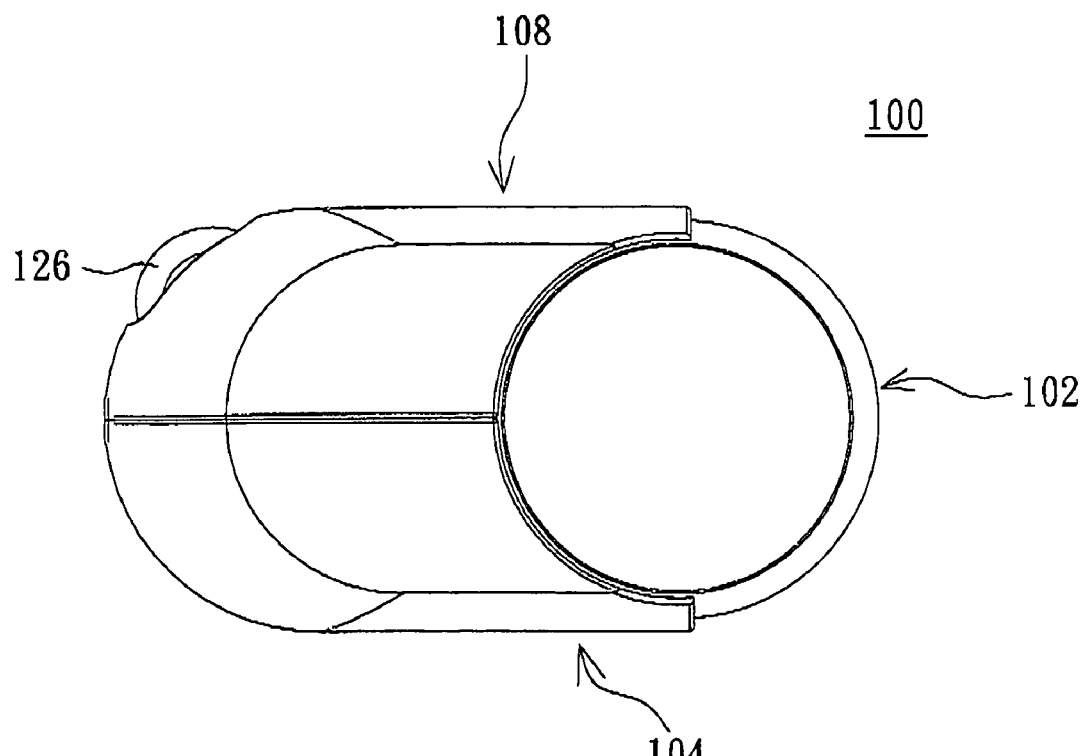
FIG. 1B shows a top view of a mouse with a built-in laser pointer according to a preferred embodiment of the invention.
Figure 1C:
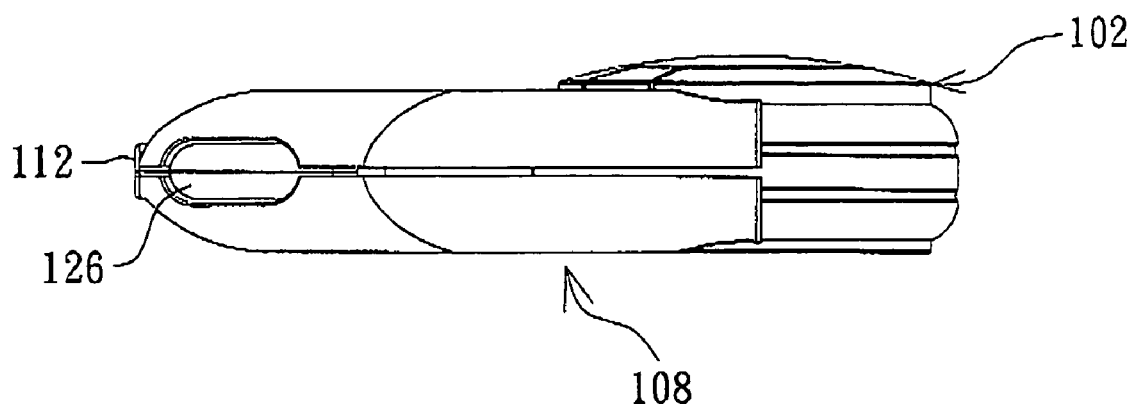
FIG. 1C shows a front view of a mouse with a built-in laser pointer according to a preferred embodiment of the invention.
Figure 1D:
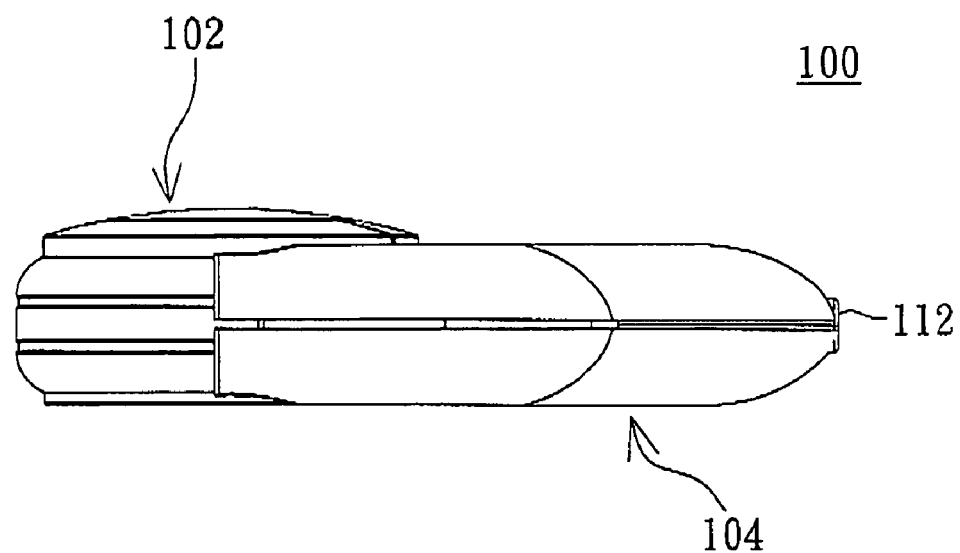
FIG. 1D shows a back view of a mouse with a built-in laser pointer according to a preferred embodiment of the invention.

Please refer to FIGS. 1A to 1E and FIGS. 2A to 2E together. FIGS. 1A to 1E respectively are an upward view, a top view, a front view, a back view and a three-dimensional diagram of a parallel-type mouse with a built-in laser pointer according to a preferred embodiment of the invention. FIGS. 2A to 2E respectively are an upward view, a top view, a front view, a back view and a three-dimensional diagram of an open-type mouse with a built-in laser pointer according to a preferred embodiment of the invention. The mouse with a built-in laser pointer 100 includes a mouse body 102, a first holding portion 104, a second holding portion 108, a laser source 112 and a laser-emitting button 114. The first holding portion 104 and the second holding portion 108 are pivotally connected to the mouse body 102 via a connecting piece, a pivot 140 for instance. The first holding portion 104 has a first button 106, wherein the first button 106 is preferably disposed on the first top surface 128 of the first holding portion 104. The second holding portion 108 has a second button 110, wherein the second button 110 is preferably disposed on the second top surface 130 of the second holding portion 108.

Figure 3:
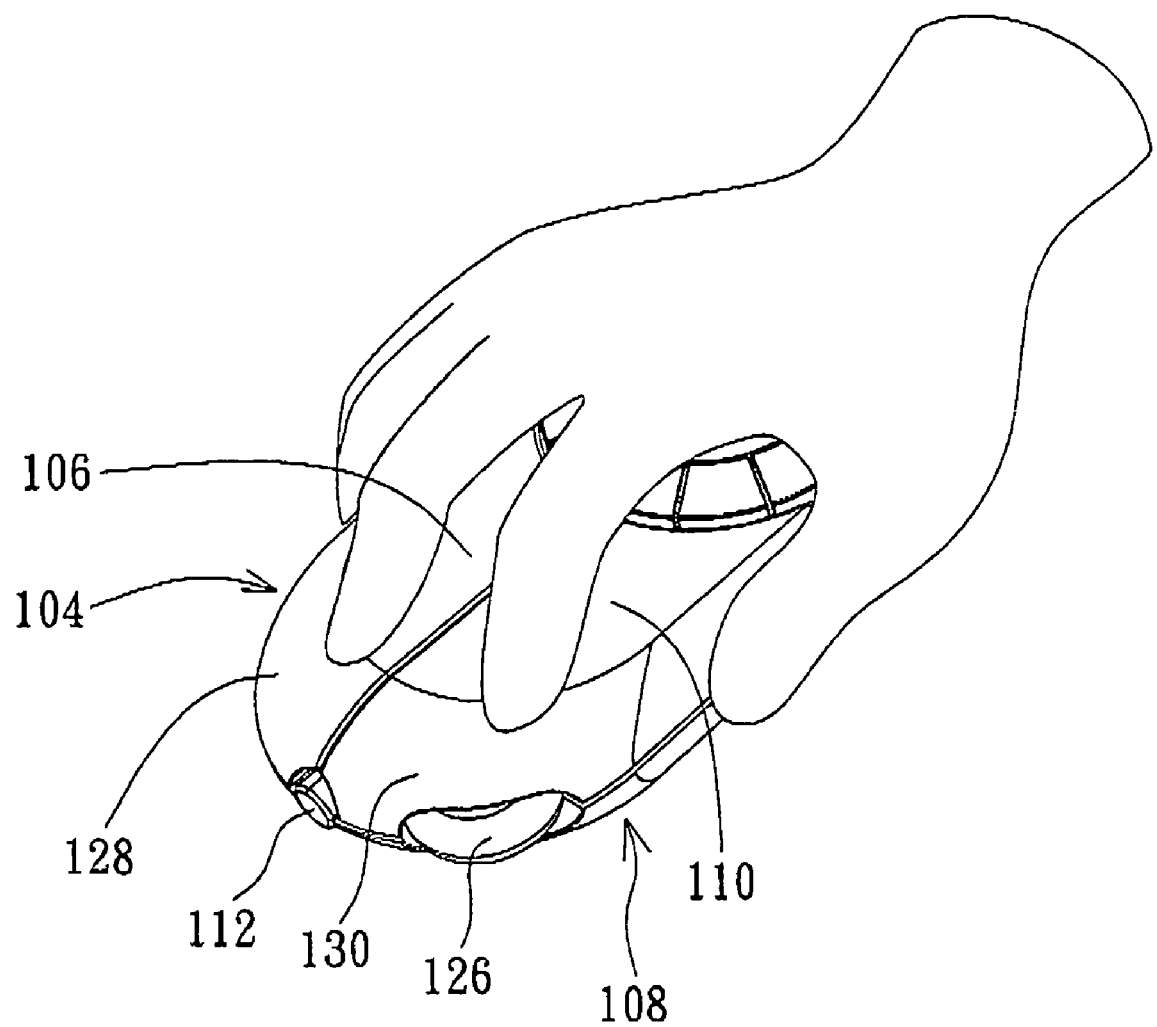
FIG. 3 is a schematic diagram showing how the user operates a parallel-type mouse with a built-in laser pointer according to a preferred embodiment of the invention.

Referring to FIG. 3, a schematic diagram showing how the user operates a parallel-type mouse with a built-in laser pointer according to a preferred embodiment of the invention is shown. When the first holding portion 104 and the second holding portion 108 are parallel to each other, the mouse with a built-in laser pointer 100 is for controlling cursor's movement on a computer screen. The user can place his or her hand on the first top surface 128 of the first holding portion 104 and the second top surface 130 of the second holding portion 108 to hold the mouse with a built-in laser pointer 100 to operate, for instance, the first button 106 having a menu display function and the second button 110 having a recognition function.

Figure 1E:
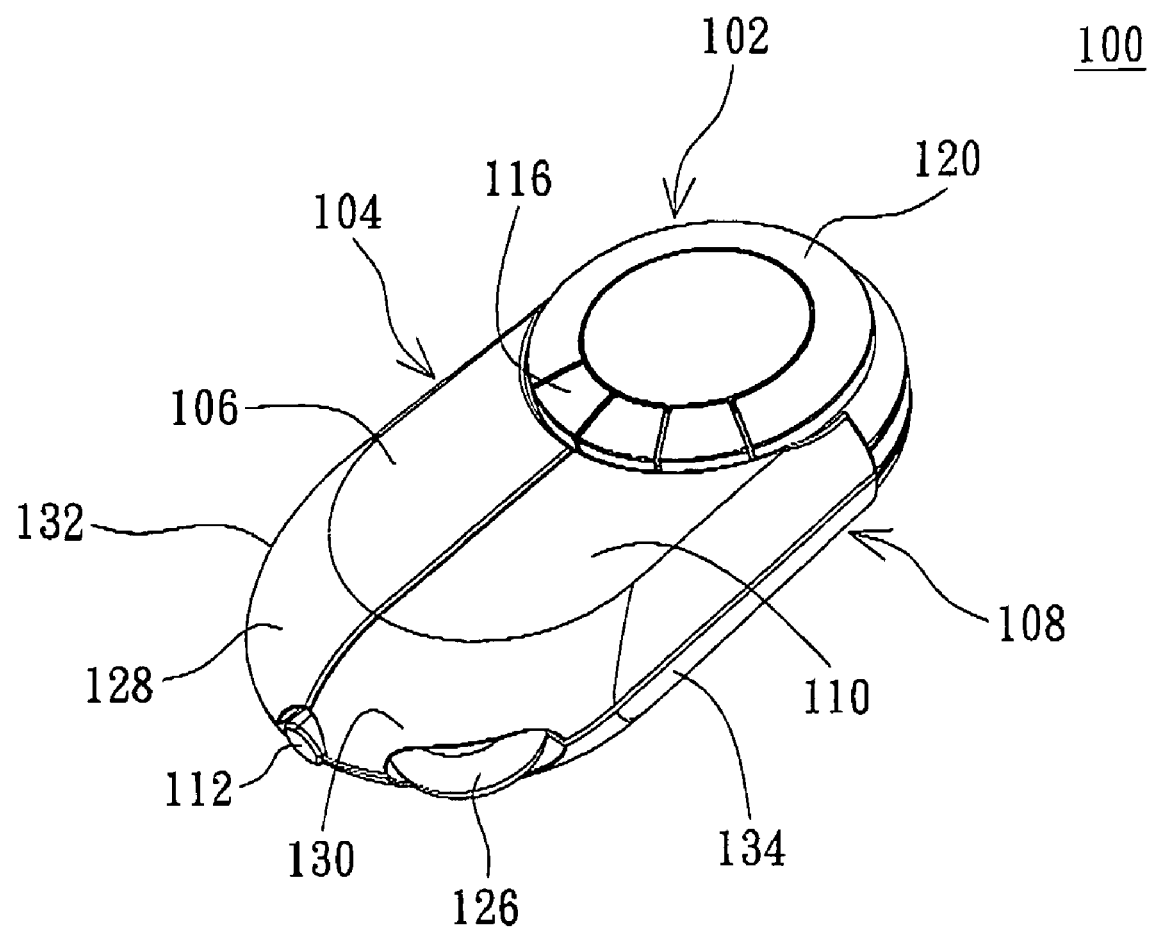
FIG. 1E shows a three-dimensional diagram of a mouse with a built-in laser pointer according to a preferred embodiment of the invention.
Figure 2A:
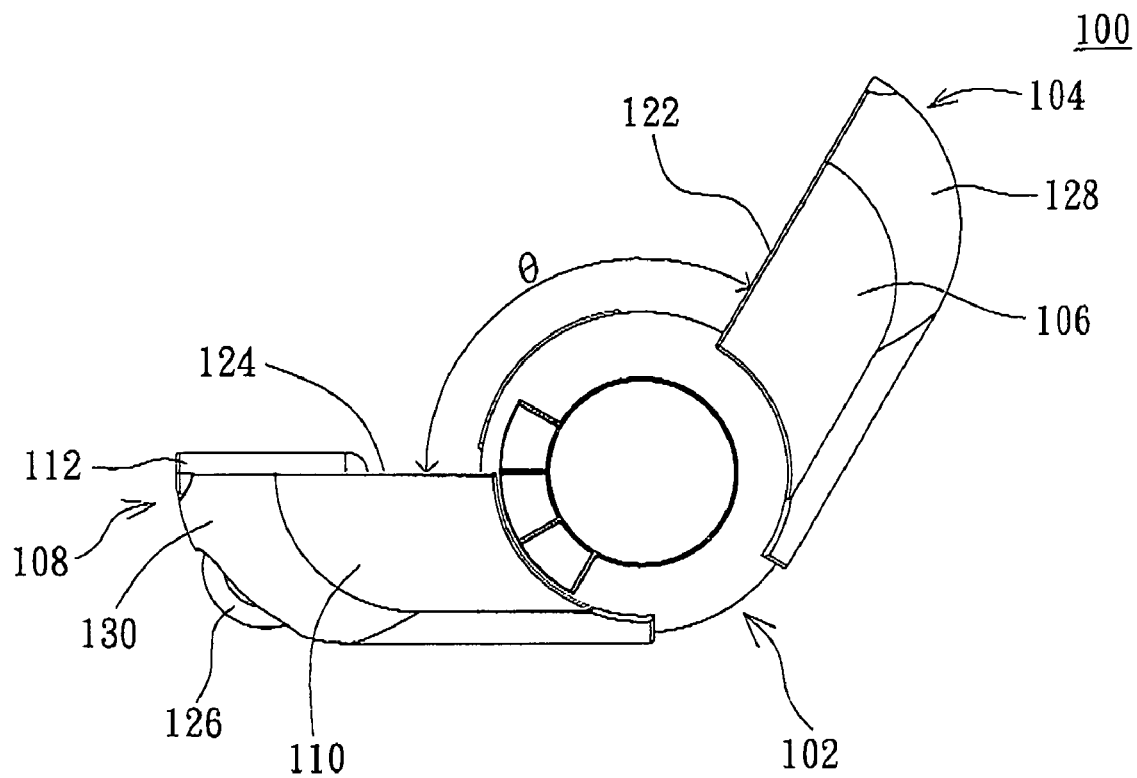
FIG. 2A shows an upward view of an open-type mouse with a built-in laser pointer according to a preferred embodiment of the invention.
Figure 2B:
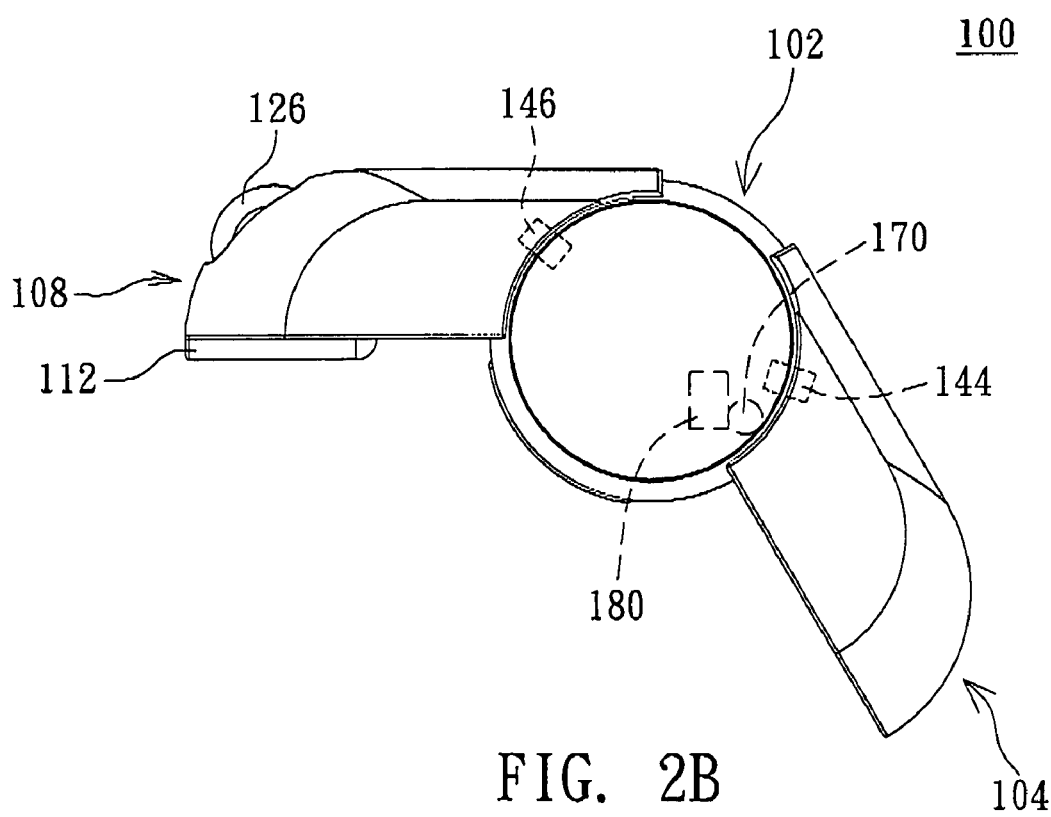
FIG. 2B shows a top view of an open-type mouse with a built-in laser pointer according to a preferred embodiment of the invention.
Figure 2C:
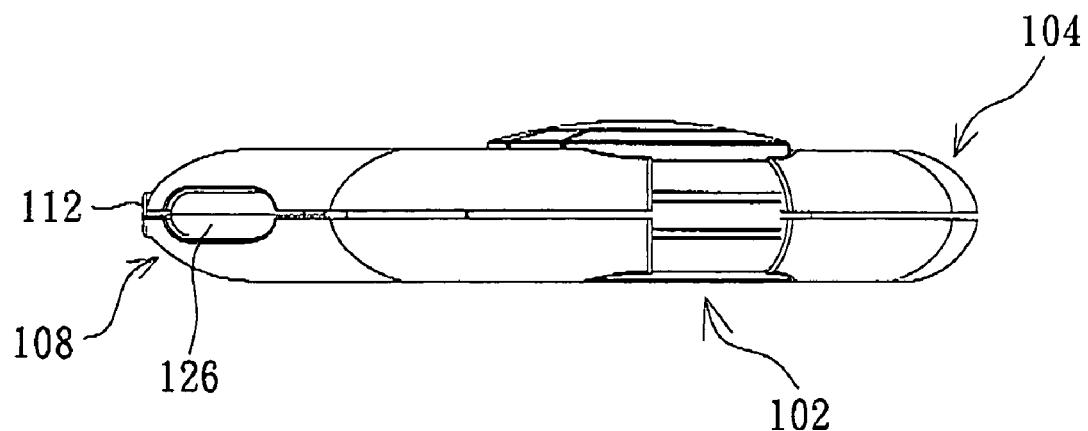
FIG. 2C shows a front view of an open-type mouse with a built-in laser pointer according to a preferred embodiment of the invention.
Figure 2D:
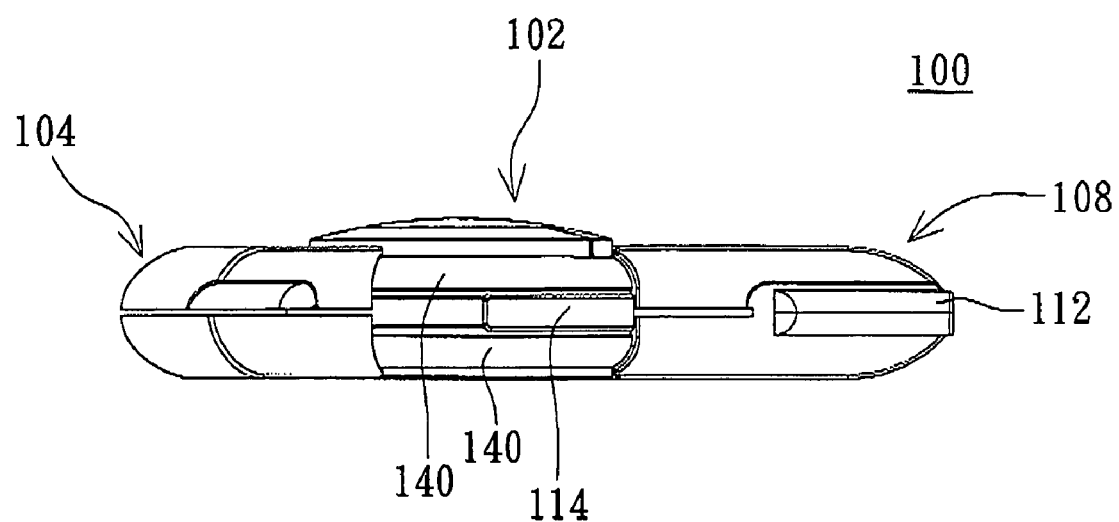
FIG. 2D shows a back view of an open-type mouse with a built-in laser pointer according to a preferred embodiment of the invention.
Figure 2E:
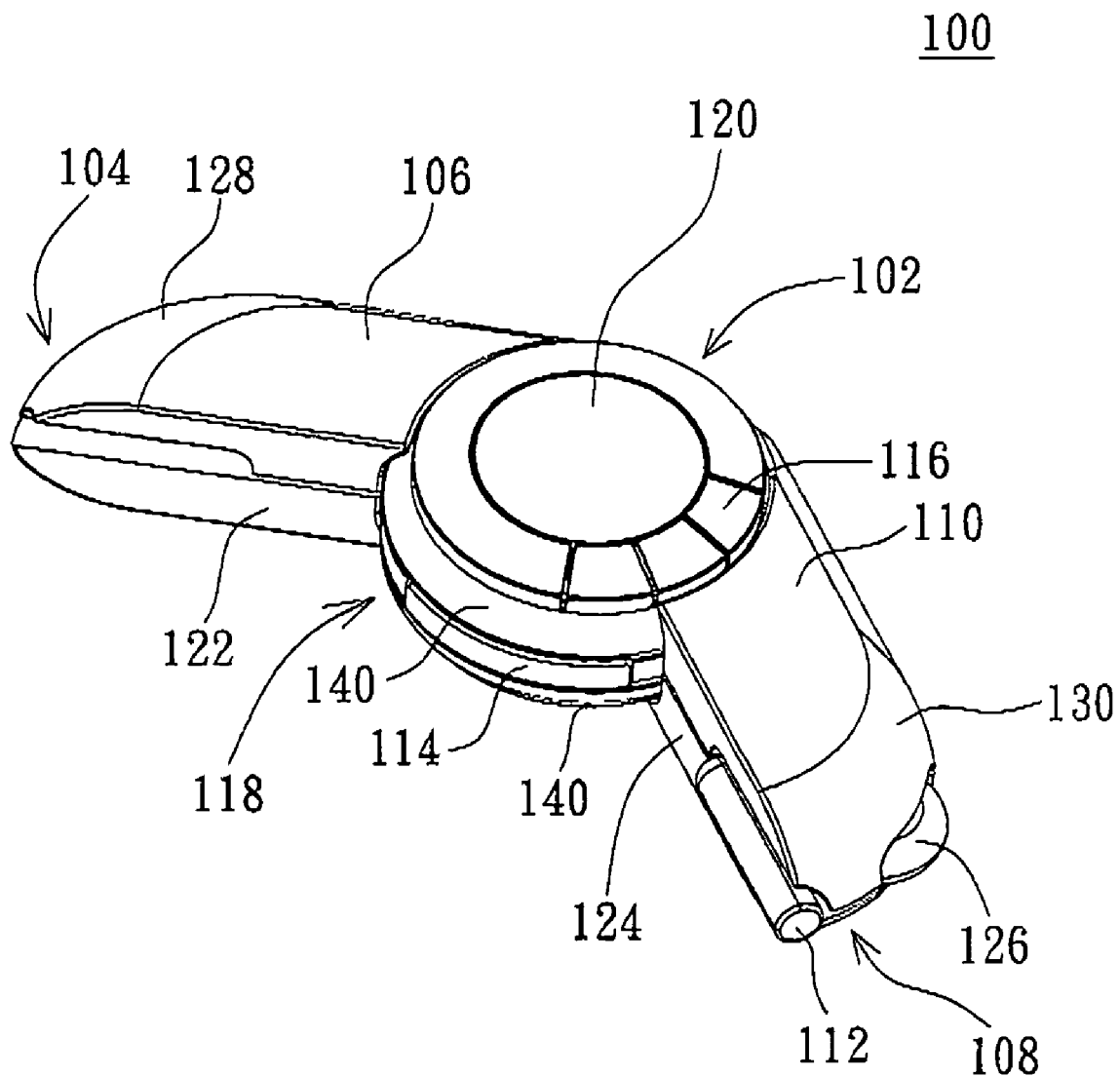
FIG. 2E shows a three-dimensional diagram of an open-type mouse with a built-in laser pointer according to a preferred embodiment of the invention.

Please refer to FIG. 1E and FIG. 2E together. The laser source 112, which is disposed on the second holding portion 108, is preferably disposed on the second lateral junction 124 with a small part being exposed to the front end of the second holding portion 108. Besides, the laser-emitting button 114 is preferably disposed on the lateral side 118 of the mouse body 102. When the first lateral junction 122 and the second lateral junction 124 contact each other, the laser-emitting button 114 is covered up by at least one of the first holding portion 104 and the second holding portion 108 as shown in FIG. 1E, lest the user might press the laser-emitting button 114 when controlling the cursor's movement on computer screen. When the first holding portion 104 and the second holding portion 108 are relatively open, the laser-emitting button 114 is exposed for the user to operate as shown in FIG. 2E.

Figure 4:
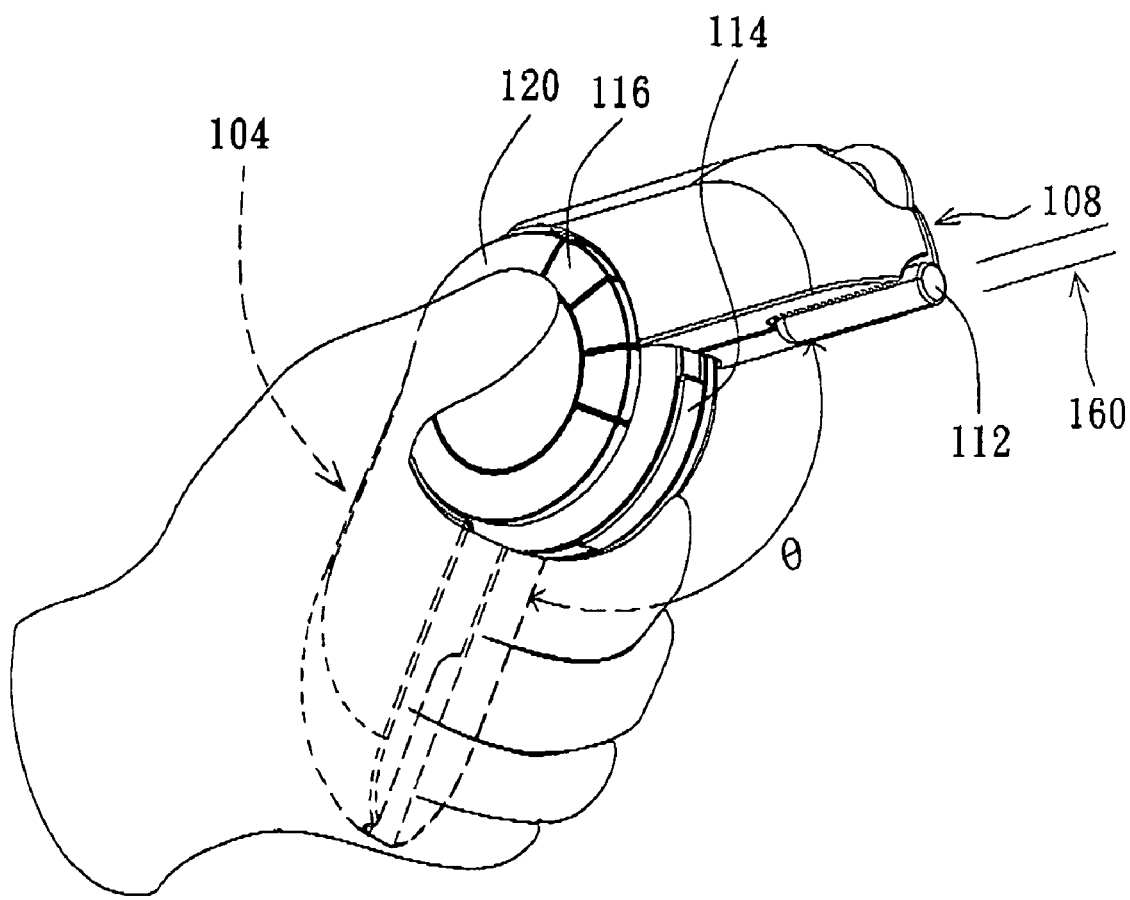
FIG. 4 is a schematic diagram showing how the user operates an open-type mouse with a built-in laser pointer according to a preferred embodiment of the invention.

However, when the first holding portion 104 and the second holding portion 108 are relatively open, the user can hold the first holding portion 104 to operate the laser-emitting button 114 for the laser source 112 to emit laser beam 160 as shown in FIG. 4. Meanwhile, the included angle θ of the first holding portion 104 and the second holding portion 108 is preferably between 90° and 180°.

Moreover, the mouse with a built-in laser pointer 100 further has a scrolling wheel 126 disposed on a lateral side of the second holding portion 134. When the first lateral junction 122 and the second lateral junction 124 contact each other, the user's fingers can rotate the scrolling wheel 126 to scroll the frame of a screen. Besides, the mouse body 102 further has a presentation control button 116. The presentation control button 116 is preferably disposed on a mouse body's top surface 120. When the first holding portion 104 and the second holding portion 108 are relatively open, the user can use his or her thumb to operate the presentation control button 116 for controlling the display of a slide as shown in FIG. 4. The presentation control button 116 can be a page-up function key, a page down function key or an enter key.

Please refer to FIG. 2B and FIG. 4 together. The mouse with a built-in laser pointer 100 further has a concealed switch 170 disposed on the pivot 140. When the first holding portion 104 and the second holding portion 108 are correspondingly opened to a particular angle, the concealed switch 170, activated by a fixing piece 180 fixed inside the mouse body 102 for instance, will switch on the laser source 112. After laser source 112 is switched on, the user can enable the laser source 112 to emit the laser beam 160 by operating the laser-emitting button 114. The disposition of the concealed switch 170 not only saves power for the laser source 112, but more importantly prevents undesirable actions. The particular angle disclosed above is preferably between 90° and 180°. Besides, the mouse body 102 and the first holding portion 104 can be electrically connected together via a first connecting wire 144, while the mouse body 102 and the second holding portion 108 can be electrically connected together via a second connecting wire 146.

The mouse with a built-in laser pointer 100 disclosed in the above preferred embodiment of the invention has the laser source 112, the laser-emitting button 114, the scrolling wheel 126 and the presentation control button 116 disposed on the second lateral junction 124, the mouse body's side surface 118, the lateral side of the second holding portion 134 and the mouse body's top surface 120 respectively. However, there is not any particular restrictions regarding the disposition of the laser source 112, the laser-emitting button 114, the scrolling wheel 126 and the presentation control button 116 as long as the user find it convenient to operate. The laser source 112 can also be disposed on the first lateral junction 122 of the first holding portion 104; laser-emitting button 114 can also be disposed on the first holding portion 104 or the top surface of the second holding portion 108; and the scrolling wheel 126 can also be disposed on the lateral side of the first holding portion 132.

Compared with a conventional mouse with presentation pointing function, the mouse with a built-in laser pointer according to the invention can change operating modes to fit the needs of different situations. When used as a laser pointer, the mouse with a built-in laser pointer according to the invention dispenses the need for holding the mouse to operate the laser pointer in an unnatural way, but rather, the presenter can hold the laser pointer in a natural and comfortable way as shown in FIG. 4. Apart from freeing the presenter of the trouble of preparing a laser pointer, the mouse with a built-in laser pointer according to the invention further has the advantages of convenient operation and easy grabbing. Furthermore, the mouse with a built-in laser pointer according to the invention adds a presentation control button providing the presenter with a unique function of controlling the display of slides which cannot be found in the conventional mouse with presentation pointing function.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mouse with a built-in laser pointer, comprising:
a mouse body;
a first holding portion, which is pivotally connected to the mouse body and has a first button;
a second holding portion, which is pivotally connected to the mouse body and has a second button;
a laser source disposed on the first holding portion or the second holding portion; and
a laser-emitting button disposed on the mouse body, the first holding portion or the second holding portion, the laser-emitting button being for switching on the laser source;
wherein when the first holding portion and the second holding portion are closed, the mouse with the built-in laser pointer acts to control a cursor's movement on a computer screen and the first button and the second button are available for operating, whereas when the first holding portion and the second holding portion are relatively open, either the first holding portion or the second holding portion can be hold to control the laser-emitting button to emit laser beams.

2. The mouse with a built-in laser pointer according to claim 1, wherein when the first holding portion and the second holding portion are relatively open, the first holding portion and the second holding portion form an included angle between 90° and 180°.

3. The mouse with a built-in laser pointer according to claim 1, wherein the first button is disposed on a first top surface of the first holding portion while the second button is disposed on a second top surface of the second holding portion, when the first holding portion and the second holding portion are parallel to each other, a user can place his or her hand on the first top surface of the first holding portion and the second top surface of the second holding portion to hold the mouse with a built-in laser pointer to operate the first button and the second button.

4. The mouse with a built-in laser pointer according to claim 1, the mouse body further having a pivot, which pivotally connects the first holding portion and the second holding portion, wherein there is a concealed switch disposed on the pivot, and when the first holding portion and the second holding portion are correspondingly opened to a particular angle between 90° and 180°, the concealed switch will be switched on to activate the laser source.

5. The mouse with a built-in laser pointer according to claim 1, wherein the laser-emitting button is disposed on a lateral side of the mouse body, when the first holding portion and the second holding portion are parallel to each other, the laser-emitting button is covered up by at least one of the first holding portion and the second holding portion, whereas when the first holding portion and the second holding portion are relatively open, the laser-emitting button is exposed for the user to operate.

6. The mouse with a built-in laser pointer according to claim 1, wherein the mouse body further has a presentation control button disposed on a top surface of the mouse body for the user to control the display of a slide.

7. The mouse with a built-in laser pointer according to claim 1, the laser source, which is disposed on a first lateral junction of the first holding portion or a second lateral junction of the second holding portion, being exposed to a front end of the first holding portion or the second holding portion, wherein when the first holding portion and the second holding portion are parallel to each other, the first lateral junction and the second lateral junction contact each other.

8. The mouse with a built-in laser pointer according to claim 1, the mouse with a built-in laser pointer further has a scrolling wheel disposed on a lateral side of the first holding portion or the second holding portion, wherein when the first holding portion and the second holding portion are parallel to each other, the user can use his or fingers to rotate the scrolling wheel to scroll the frame of a screen.

9. The mouse with a built-in laser pointer according to claim 1, the mouse with a built-in laser pointer further comprising a first connecting wire and a second connecting wire, wherein the first connecting wire is for electrically connecting the mouse body and the first holding portion while the second connecting wire is for electrically connecting the mouse body and the second holding portion.

10. A mouse with a built-in laser pointer, comprising:
a mouse body;
a first holding portion, which is pivotally connected to the mouse body and has a first top surface, a first lateral junction and a first button disposed on the first top surface;
a second holding portion, which is pivotally connected to the mouse body and has a second top surface, a second lateral junction and a second button disposed on the second top surface;
a laser source disposed on the first lateral junction or the second lateral junction; and
a laser-emitting button for switching on the laser source, the laser-emitting button being disposed on the mouse body, the first holding portion or the second holding portion;
wherein when the first lateral junction and the second lateral junction contact each other, the mouse with a built-in laser pointer acts to control a cursor's movement on a computer screen, and the first button and the second button are available for operating, whereas when the first holding portion and the second holding portion are relatively open, either the first holding portion or the second portion are relatively open to control the laser-emitting button to emit laser beams.

11. The mouse with a built-in laser pointer according to claim 10, wherein when the first holding portion and the second holding portion are relatively open, the first holding portion and the second holding portion form an included angle between 90° and 180°.

12. The mouse with a built-in laser pointer according to claim 10, the mouse body further having a pivot, which pivotally connects the first holding portion and the second holding portion, wherein there is a concealed switch disposed on the pivot, and when the first holding portion and the second holding portion are correspondingly opened to a particular angle between 90° and 180°, the concealed switch will be switched on to activate the laser source.

13. The mouse with a built-in laser pointer according to claim 10, wherein the laser-emitting button is disposed on a lateral side of the mouse body, when the first holding portion and the second holding portion are parallel to each other, the laser-emitting button is covered up by at least one of the first holding portion and the second holding portion, whereas when the first holding portion and the second holding portion are relatively open, the laser-emitting button is exposed for the user to operate.

14. The mouse with a built-in laser pointer according to claim 10, wherein the mouse body further has a presentation control button disposed on a top surface of the mouse body for the user to control the display of a slide.

15. The mouse with a built-in laser pointer according to claim 10, wherein the laser source, which is disposed on the first lateral junction or the second lateral junction, is exposed to the front end of the first holding portion or the second holding portion.

16. The mouse with a built-in laser pointer according to claim 10, the mouse with a built-in laser pointer further has a scrolling wheel disposed on a lateral side of the first holding portion or the second holding portion, wherein when the first holding portion and the second holding portion are parallel to each other, the user can use his or fingers to rotate the scrolling wheel to scroll the frame of a screen.

17. The mouse with a built-in laser pointer according to claim 10, the mouse with a built-in laser pointer further comprising a first connecting wire and a second connecting wire, wherein the first connecting wire is for electrically connecting the mouse body and the first holding portion while the second connecting wire is for electrically connecting the mouse body and the second holding portion.

* * * * *